US012567317B2

(12) United States Patent
Ramaswami

(10) Patent No.: US 12,567,317 B2
(45) Date of Patent: Mar. 3, 2026

(54) SYSTEM AND METHOD FOR PREVENTION OF ACCIDENTS DUE TO TRIPPING OR BUMPING ON COMMON EQUIPMENT AND OPEN DOORS

(71) Applicant: Vaidyanathan Ramaswami, Branchburg, NJ (US)

(72) Inventor: Vaidyanathan Ramaswami, Branchburg, NJ (US)

( * ) Notice: Subject to any disclaimer, the term of this patent is extended or adjusted under 35 U.S.C. 154(b) by 36 days.

(21) Appl. No.: 18/643,604

(22) Filed: Apr. 23, 2024

(65) Prior Publication Data

US 2024/0378975 A1 Nov. 14, 2024

Related U.S. Application Data

(60) Provisional application No. 63/501,492, filed on May 11, 2023.

(51) Int. Cl.
*G08B 21/02* (2006.01)

(52) U.S. Cl.
CPC .................................... *G08B 21/02* (2013.01)

(58) Field of Classification Search
CPC ...................................................... G08B 21/02
See application file for complete search history.

(56) References Cited

U.S. PATENT DOCUMENTS

| | | | | |
|---|---|---|---|---|
| 5,841,356 | A | 11/1998 | Woodruff et al. | |
| 6,700,500 | B1 * | 3/2004 | Burnett | A47L 15/4257 340/689 |
| 6,741,183 | B1 | 5/2004 | Burnett | |
| 2009/0184821 | A1 * | 7/2009 | Kuris | G08B 21/0461 340/541 |
| 2009/0273486 | A1 * | 11/2009 | Sitbon | G08G 1/095 340/907 |
| 2016/0100252 | A1 | 4/2016 | Pattok | |
| 2021/0113051 | A1 | 4/2021 | Hodapp, Jr. | |

OTHER PUBLICATIONS

International Search Report and Written Opinion issued in PCT/US24/25870, mailed on Aug. 21, 2024. (12 pages).

* cited by examiner

*Primary Examiner* — Brian Wilson
(74) *Attorney, Agent, or Firm* — ICE MILLER LLP

(57) ABSTRACT

A system and method for rendering an alarm signal when a door of an appliance is in a hazard condition. The system includes at least one electromagnetic (EME) transducer configured to render an alarm signal when the door of the appliance is in the hazard condition, wherein the at least one electromagnetic (EME) transducer includes at least one of a motion sensor unit, a light emitter unit, a gas ejector unit, and a sound generator, and wherein the appliance is a household appliance. The system can include a controller communicatively coupled to the at least one EME transducer and configured to receive a motion detection signal from the motion sensor unit, and send a light emission signal, a gas ejection signal, or a sound signal to the at least one EME transducer.

20 Claims, 7 Drawing Sheets

SYSTEM AND METHOD FOR PREVENTION OF ACCIDENTS DUE TO TRIPPING OR BUMPING ON COMMON EQUIPMENT AND OPEN DOORS

This application claims priority to and the benefit of provisional U.S. Patent Application No. 63/501,492, filed May 11, 2023, which is hereby incorporated by reference herein in its entirety.

FIELD OF THE DISCLOSURE

The present disclosure relates to an apparatus, a system and a computer-implemented method for preventing accidents due to tripping or bumping on common equipment and open doors.

BACKGROUND OF THE DISCLOSURE

Equipment used in residential, industrial, or other settings can create obstructions at low heights not in the typical line of sight, thereby causing a risk of tripping and falling. Indeed, many accidents do happen of that type resulting even in major injuries like leg fractures.

According to various estimates, there are approximately 85 million dishwashers in service in the USA alone. There are similarly large numbers of clothes dryers and cooking ranges, with millions of such appliances being sold each year in the USA and elsewhere. These statistics are indicative of the fact that even if the chance of tripping on an open door is very small, the sheer numbers of appliances posing the risk is too large to be ignored.

Although this is well-known, unfortunately presently available equipment does not incorporate safety features to prevent such accidents. This may well be due to the fact that their designs have undergone few major changes and predate some technological advances that have occurred.

There exists an urgent and unmet need for a remediation solution that can prevent accidents due to tripping or bumping on common equipment and open doors.

SUMMARY OF THE DISCLOSURE

The disclosure provides a novel remediation solution that can prevent accidents due to tripping or bumping on common equipment and open doors. In various embodiments, the remediation solution includes a system or a computer-implemented method comprising one or more electromagnetic energy (EME) transducers that are configured to generate electromagnetic radiation in the portion of the electromagnetic spectrum perceptible to animals such as, for example, humans. The generated electromagnetic radiation can include wavelengths or frequencies that can be sensed by an animal, such as, for example, in the 10 Hz-300 kHz range (preferably between 20 Hz and 20 kHz) for sound signals or 350 nm to 800 nm range for visual signals.

In various embodiments, the EME transducer can include an optical arrangement that can be connected or affixed to common equipment used in residential, industrial, institutional, or other settings, and configured to prevent accidental injuries due to bumping or tripping against retractable structures such as, for example, open doors, retractable furniture, or other residential, industrial, or institutional structures that can extend, retract, or pivot into a pathway of an animal. The EME transducer can include a light emitting diode (LED), a plurality of LEDs, a two-dimensional (2D) array of LEDs, a three-dimensional (3D) array of LEDs, a laser diode, a plurality of laser diodes, a 2D array of laser diodes, a 3D array of laser diodes, or other light emitting device.

In various embodiments, the EME transducer can include one or more gas propulsion devices, including, for example, a fan, a compressor, a compressed gas canister, a nozzle, an array of nozzles, or other gas ejection device, or any combination of the foregoing.

In various embodiments, the EME transducer can include a sound reproducing device such as, for example, a speaker, or a device that can convert electrical signals to sound waves that can be heard or felt by an animal.

In various embodiments, the system and method can include mechanical barriers and the EME transducers can be configured to operate and control the mechanical barriers.

In various embodiments, the system and method can include a detector configured to trigger the EME transducer. The detector can be configured to sense an approaching object and send a detection signal to the EME transducer to reproduce, for example, a sound signal, a visual signal, or activate the mechanical barrier.

The EME transducer can be configured to generate lighting and alarms as well as triggered mechanical barriers such as, for example, mechanical gates.

In various embodiments, the system and method can include fixed or mobile equipment or components. The system can be battery or solar energy powered to support mobile applications.

In at least one embodiment, the system can be retrofitted, or can include equipment or components that can be retrofitted, into existing equipment or structures. The system can include one or more battery operated devices that can be installed or attached (for example, magnetically or through some other means) to such equipment or structures. In at least one alternative embodiment, the system can be built into, or can include equipment or components built into, new equipment or structures.

An embodiment of the disclosure includes a system for rendering an alarm signal when a door of an appliance is in a hazard condition. The system comprises at least one electromagnetic (EME) transducer configured to render an alarm signal when the door of the appliance is in a hazard condition. The at least one electromagnetic (EME) transducer includes at least one of a motion sensor unit, a light emitter unit, a gas ejector unit, and a sound generator, wherein the appliance is a household appliance. The system can comprise a position sensor configured to detect a position of the door of the appliance.

The system can comprise a controller communicatively coupled to the at least one EME transducer and configured to receive a motion detection signal from the motion sensor unit.

The system can comprise a controller communicatively coupled to the at least one EME transducer and configured to send an electronic signal comprising at least one of a light emission signal, a gas ejection signal, or a sound signal.

The system can comprise a controller communicatively coupled to the at least one EME transducer and the position sensor, wherein the controller is configured to send an electronic signal in response to receiving at least one of a motion detection signal from the motion sensor unit and a door position value from the position sensor.

The controller can comprise a driver configured to generate electronic signals to adjust or control one of the motion sensor unit, the light emitter unit, the gas ejector unit, and the sound generator.

In the system, the at least one EME transducer can be provided as an integrated device provided as a single piece that comprises one or more of the motion sensor unit, the light emitter unit, the gas ejector unit, and the sound generator.

In the system, the one or more of the motion sensor unit, the light emitter unit, the gas ejector unit, and the sound generator can be located external to, and separate from, the appliance.

The gas ejector unit can be configured to supply a flow of steam, gas, or particles for reflection of light for visibility as a beam. The gas ejector unit can comprise a fan, at least one nozzle, and a gas supply.

An embodiment of the disclosure includes a computer-implemented method for rendering an alarm signal when a door of an appliance is in a hazard condition. The method includes receiving a door position signal that includes a door position value, determining a hazard condition based on the door position value, generating an electronic signal based on the hazard condition, and sending the electronic signal to at least one electromagnetic (EME) transducer configured to render an alarm signal in response to the received electronic signal. The at least one electromagnetic (EME) transducer includes at least one of a motion sensor unit, a light emitter unit, a gas ejector unit, and a sound generator. The appliance can be a household appliance. The method can further comprise receiving a motion detection signal from the motion sensor unit, wherein the determining the hazard condition is based on the door position value and the motion detection signal. The electronic signal can comprise at least one of a light emission signal that causes the light emitter unit to render one or more light beams in a predetermined beam direction, a gas ejection signal that causes the gas ejector to supply a pressurized gas in a predetermined gas direction, and a sound signal to cause the sound generator to emit a sound. The door position signal can be received from an accelerometer. The at least one EME transducer can be an integrated device provided as a single piece that comprises the at least one of the motion sensor unit, the light emitter unit, the gas ejector unit, and the sound generator. One or more of the motion sensor unit, the light emitter unit, the gas ejector unit, and the sound generator can be located external to, and separate from, the appliance. The gas ejector unit can be configured to supply a flow of steam, gas, or particles for reflection of light for visibility as a beam. The gas ejector unit can include a fan, at least one nozzle, and a gas supply.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

Figure 1:
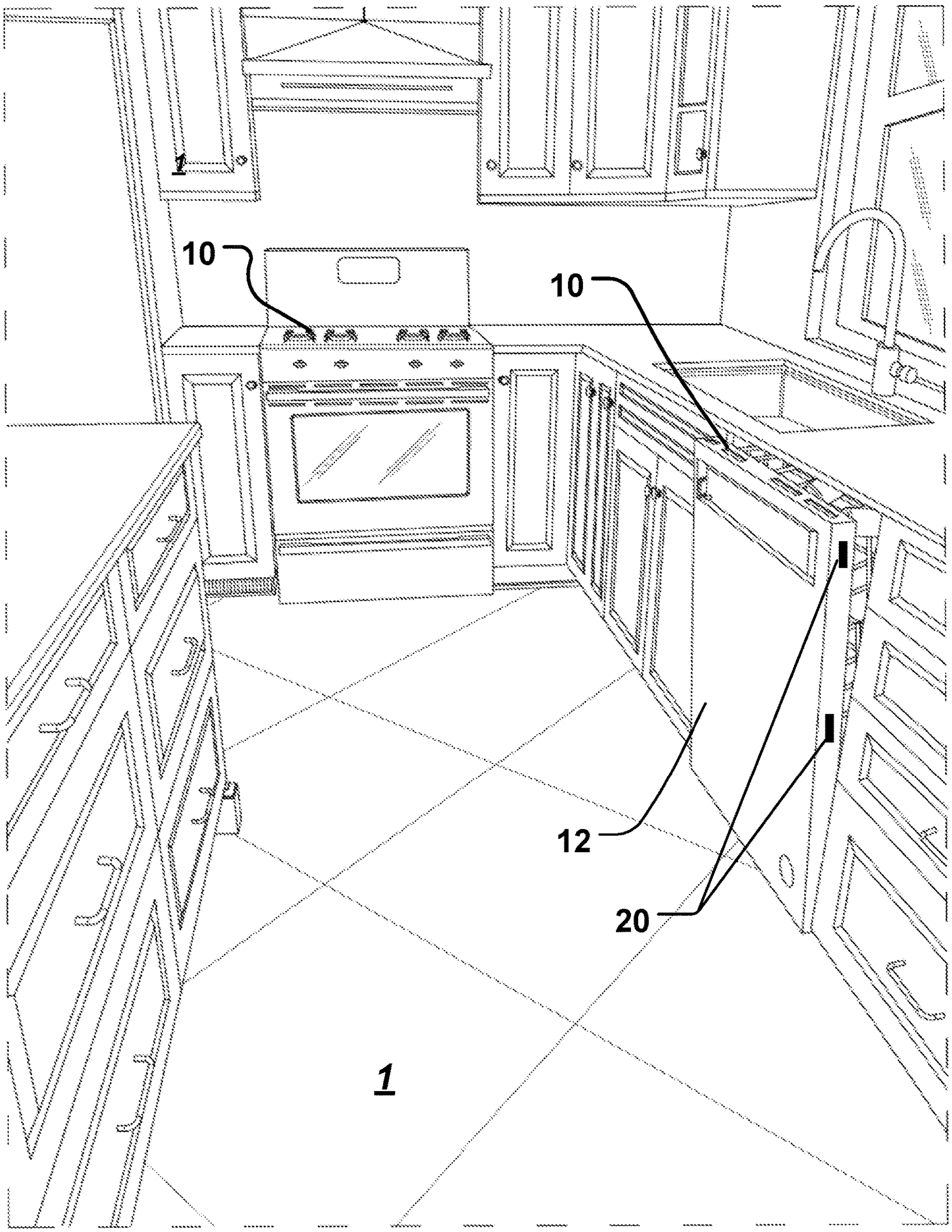
FIG. 1 illustrates an example of an environment having an appliance equipped with a drop-down door.

The present disclosure is further described in the detailed description that follows.

DETAILED DESCRIPTION OF THE DISCLOSURE

The disclosure and its various features and advantageous details are explained more fully with reference to the non-limiting embodiments and examples that are described or illustrated in the accompanying drawings and detailed in the following description. It should be noted that features illustrated in the drawings are not necessarily drawn to scale, and features of one embodiment can be employed with other embodiments as those skilled in the art would recognize, even if not explicitly stated. Descriptions of well-known components and processing techniques may be omitted so as to not unnecessarily obscure the embodiments of the disclosure. The examples are intended merely to facilitate an understanding of ways in which the disclosure can be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

FIG. 1 shows a non-limiting example of an environment 1 having one or more appliances 10, at least one of which is equipped with a door 12. The appliance 10 can be equipped with a door 12 comprising, for example, a side-wise opening door, a drop-down door, or a pull-up door. The appliance 10 can be equipped with one or more electromagnetic energy (or EME) transducers 20 (shown, for example, in FIG. 5). The appliance can be equipped with, or connected to, an obstruction alarm (OA) system 100 (shown, for example, in FIG. 4), including an alarm controller 30 and the one or more EME transducers 20.

Figure 2:
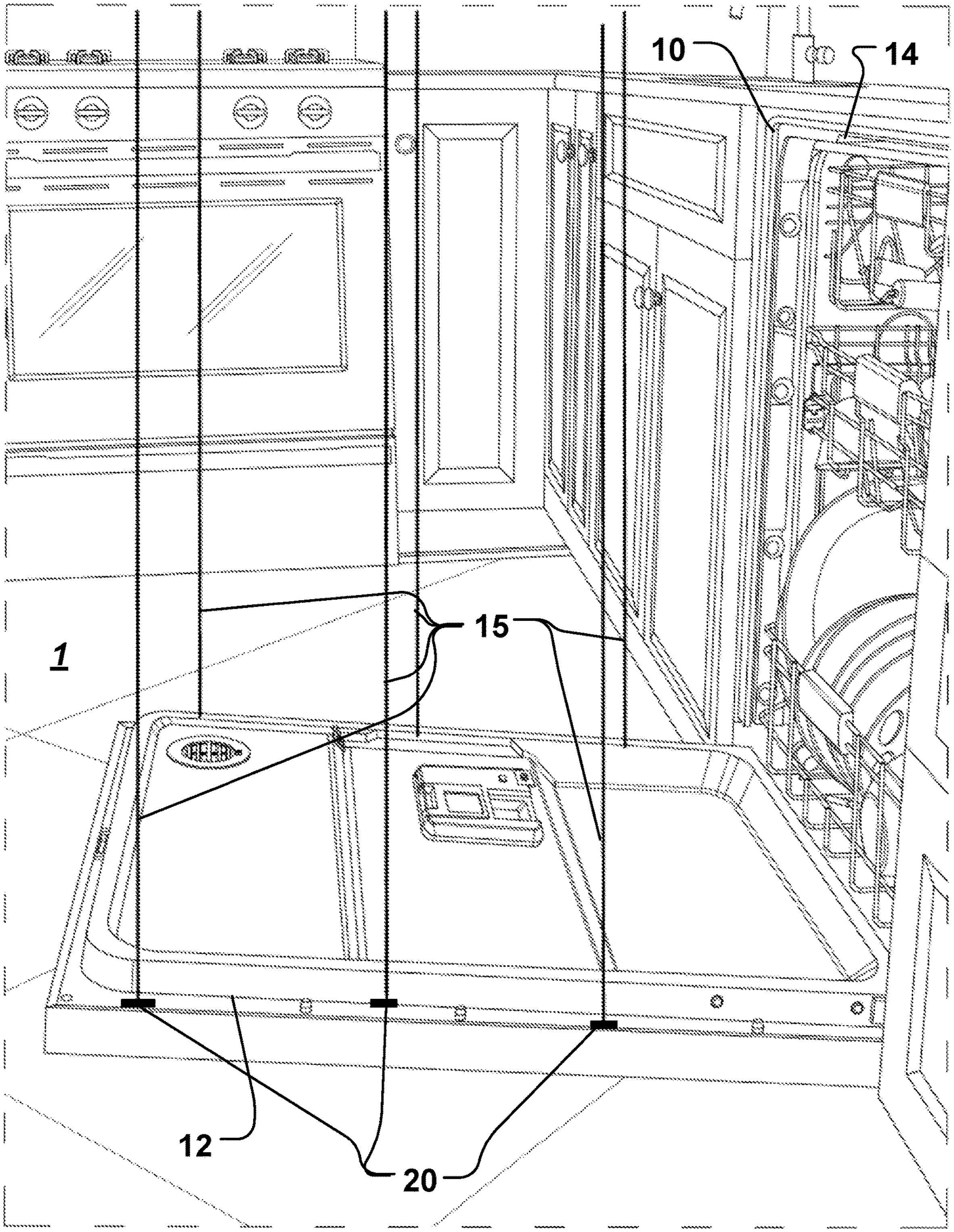
FIG. 2 illustrates the appliance of FIG. 1 with the drop-down door in an open position and one or more light beams emitted in a predetermined beam direction.
Figure 3:
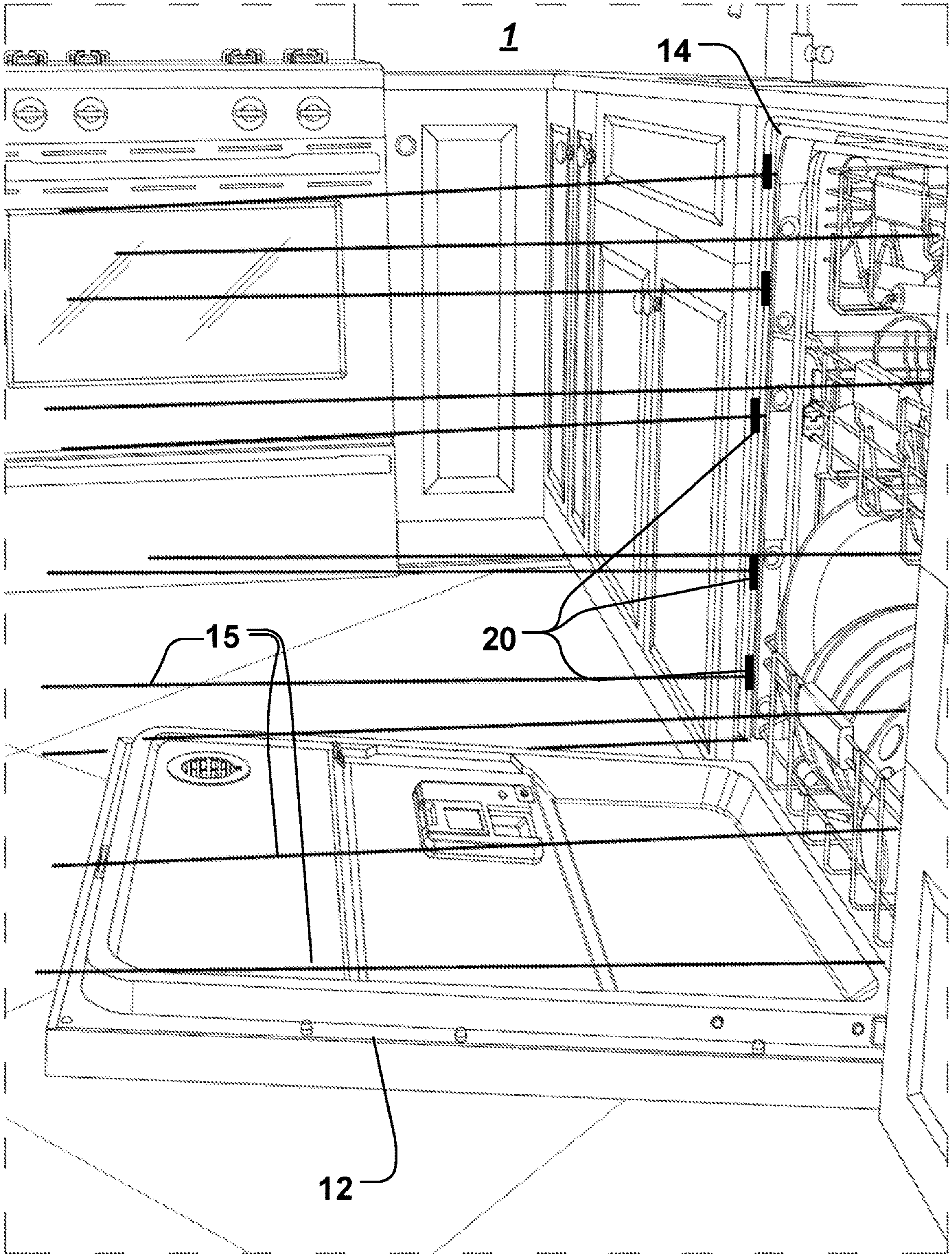
FIG. 3 illustrates the appliance of FIG. 1 with the drop-down door in the open position and one or more light beams emitted in another predetermined beam direction.

FIGS. 2 and 3 illustrate the appliance 10 with the door 12 in an open position and equipped with light beams 15 emitted in different beam directions. The appliance 10 includes one or more EME transducers 20, each of which can be configured to emit one or more light beams 15 in one or more predetermined beam directions. The EME transducers 20 can be configured for installation in the door 12 and/or the body 14 of the appliance. In certain embodiments, the EME transducers 20 can be configured to be attached to a surface, such as, for example, on the door 12, the body 14, or another surface, separate from the appliance 10, such as, for example, on another appliance, a nearby structure, a wall, a ceiling, or a floor sufficiently near the appliance 10 to generate a warning signal within or near to the pathway that might be obstructed by the door 12 when open.

In the embodiments depicted in FIGS. 2 and 3, the EME transducers 20 are installed in the door 12 and the body 14, respectively, and configured to emit one or more light beams 15 in one or more predetermined beam directions. As seen in the embodiment in FIG. 2, the EME transducers 20 are configured to emit one or more light beams 15 from the door 12 in a beam direction that is substantially perpendicular to an inner surface of the door 12, which can be substantially parallel to the gravity vector when the door 12 is in the drop-down open position.

In the embodiment of FIG. 3, one or more of the EME transducers 20 are installed in the body 14 of the appliance 10 and configured to emit one or more light beams 15 from the body 14 in a beam direction that is substantially perpendicular to the gravity vector.

In various embodiments, the EME transducers 20 can be installed at various locations on or in the appliance 10, such that when the door 12 is open, one or more light beams 15 are emitted to alert a user of the open condition of the door 12. The EME transducers 20 can be configured to emit the light beams 15 in response to the door 12 opening and/or in response to detecting motion, such as, for example, a person or animal approaching the appliance 10 or door 12.

As noted earlier, the EME transducer 20 can be configured for drop-down doors, pull-up doors, or side-wise opening doors that, when open, can obstruct or block passageways fully or partially, thereby obstructing a pathway and posing a risk to those traveling in the pathway.

In various embodiments, where warning is through a light beam, the device can be augmented by a system providing a flow of steam, gas, or particles for reflection of the light for visibility as a beam. In such cases, the system 100 can incorporate appropriate storage compartments for the emitted material as also a fan and nozzles to emit the material in a predetermined gas direction and amount.

In various embodiments, the system 100 (shown, for example, in FIG. 4), including EME transducer 20 (shown, for example, in FIG. 5) and controller 30 (shown, for example, in FIG. 6) can be implemented with appliances or equipment in other environments, including for example, residential, commercial, industrial, institutional, or other common environments that can benefit from alerting humans or animals travelling in pathways that might be obstructed by a moveable part such as, for example, a door, a window, a swing gate, a step-up stool, drop-down furniture (for example, desk, sofa, bed, or stool), or saw-horses with drop-down areas for placement of tools and accessories, as will be understood by those skilled in the art.

Referring to FIGS. 2 and 3, the system 100 can include a plurality of EME transducers 20 that can be installed in, or attached to, and configured to emit beams 15 from the door 12 and/or the body 14 of the appliance 10 in a predetermined direction; such as, for example, a direction that is perpendicular to an inner plane of the drop-down door 12, as seen in FIG. 2, or a direction that is perpendicular to a perimeter of the opening of the appliance as seen in FIG. 3, or any door position value (for example, angle) therebetween to optimize visibility of the light beams in the pathway blocked by the open door 12 to alert oncoming animals or people.

Figure 4:
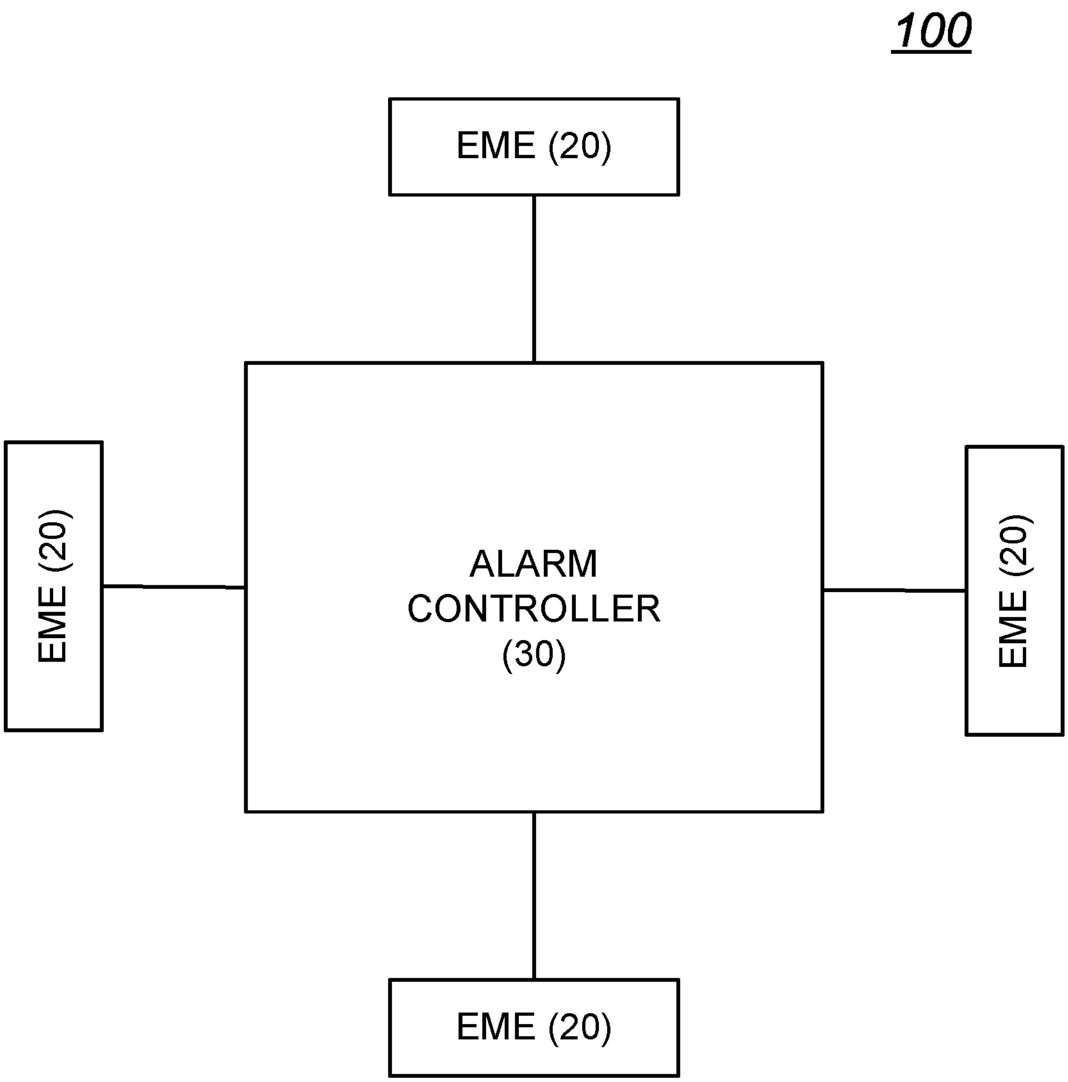
FIG. 4 illustrates an embodiment of an obstruction alarm system, according to the principles of the disclosure.
Figure 5:
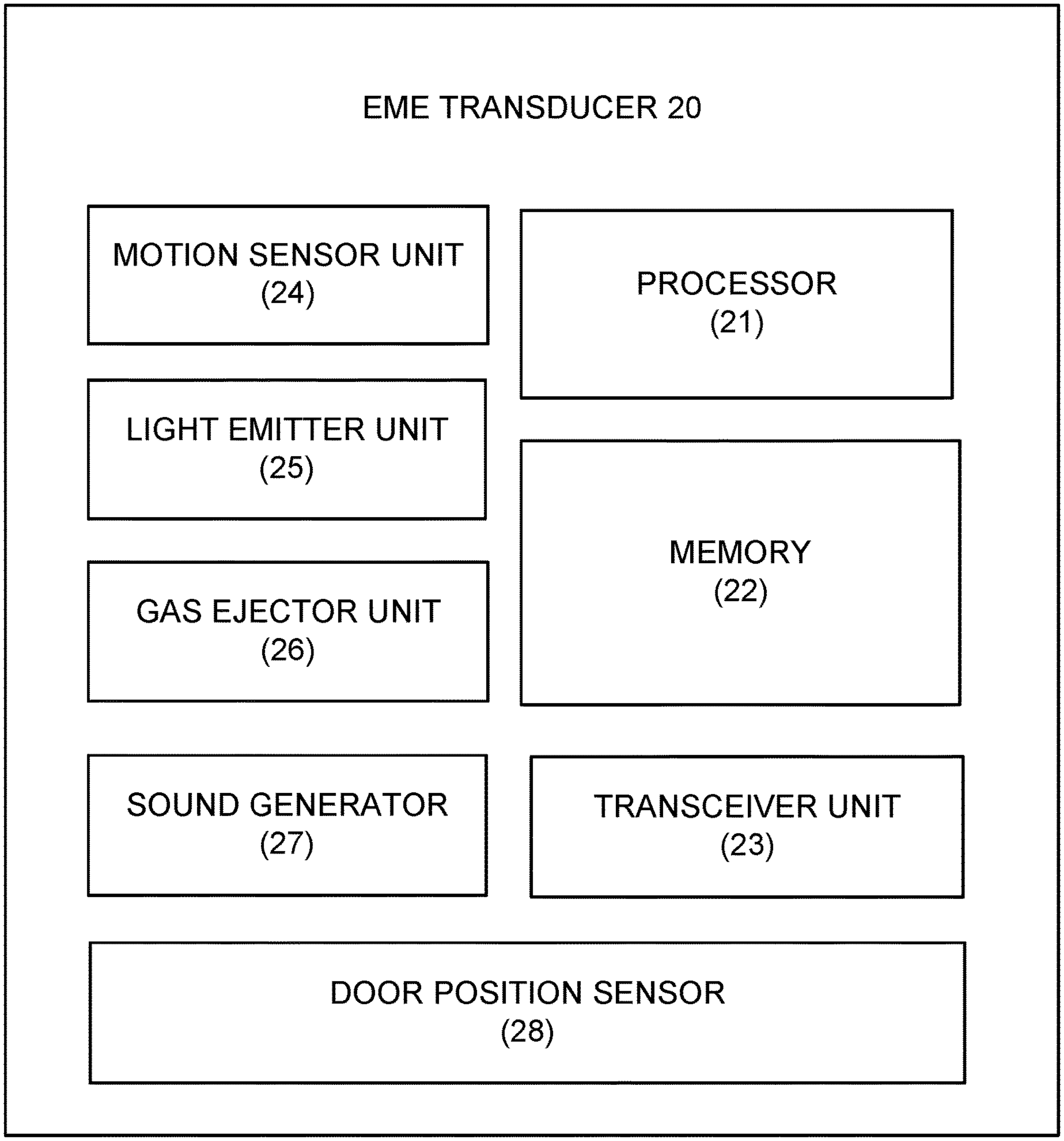
FIG. 5 illustrates an embodiment of an electromagnetic energy (EME) transducer, according to the principles of the disclosure.

FIG. 5 shows a nonlimiting embodiment of the EME transducer 20. The EME transducer 20 can include at least one of a processor 21, a memory 22, a transceiver unit 23, a motion sensor unit 24, a light emitter unit 25, a gas ejector unit 26, a sounder generator 27, and a door position sensor 28. Any one or more of the components 21 to 28 can be communicatively coupled to each other and/or to the controller 30 (shown, for example, in FIGS. 4 and 6) via one or more communication links.

The EME transducer 20 can be configured as an integrated warning device provided as a single piece and comprising at least one of the components 21-28. In various embodiments, any one or more of the components 21-28 can be provided as a unique sensor device or warning device that is physically separate from the remaining components, which in turn can be provided in a single integrated warning device or as distinct devices.

The processor 21 includes, for example, an application specific integrated circuit (ASIC) or a microprocessor (μP) possibly endowed with Artificial Intelligence and Deep Learning capabilities (for example to determine if an oncoming animal is an adult, a child, or a pet).

The memory 22 includes a non-transient computer storage that can be configured to store data and executable computer program instructions, including computer program code executable by the processor 21.

The transceiver 23 includes a transmitter and a receiver configured to send and receive data and instruction signals. The transceiver 23 is configured to send and receive data and/or instruction signals to/from the controller 30 (shown, for example, in FIGS. 4 and 6), including, for example, motion detection signals, light emission signals, gas ejection signals, or sound generation signals.

The motion sensor unit 24 can include, for example, an infrared (IR) sensor configured to detect motion in an area within a predetermined distance from the motion sensor unit 24. In various embodiments, the motion sensor unit 24 is configured to be adjustable, so that the motion detection area can be adjusted to detect motion within a radius of, for example, two feet, three feet, four feet, five feet, or greater.

In an embodiment, the motion sensor unit 24 is configured to communicate with a motion sensor driver 150A (shown in FIG. 6), which can provide range sensitivity signals to adjust and set a distance range for detection of motion by the motion sensor unit 24.

The light emitter unit 25 can include a light source, a light (or laser) emitting device (LED), a plurality of LEDs, an array of LEDs, a plurality of LEDs, or a display. The LEDs can include different colors that are assigned to different warning conditions such as, for example, a green light beam for a door 12 that is nearly completely closed and a red light beam when the door 12 is nearly completely open. The display can include a video display, a holographic display, or other device capable of displaying a visible signal.

In an embodiment, the light emitter unit 25 is configured to communicate with an LED driver 150B (shown in FIG. 6), which can provide instruction signals to operate and control the light emitter unit 25.

The gas ejector unit 26 can include one or more gas ejection nozzles (not shown), a valve (not shown), and a pressurized gas (not shown), such as, for example, stored a gas supply line (not shown) and a tank (not shown). The valve is configured to open or close based on a driver signal, such as, for example, a signal received from the gas driver 150C (shown in FIG. 6).

In an embodiment, the gas ejector unit 26 is configured to communicate with the gas driver 150C, which can provide instruction signals to operate and control the gas ejector 26.

The sound generator 27 can include a speaker or other device capable of producing a sound. In an embodiment, the sound generator is configured to communicate with the sound driver 150D (shown in FIG. 6), which can provide instruction signals to operate and control the sound generator 27.

Any one or more of the motion sensor unit 24, light emitting unit 25, gas ejector unit 26, and sound generator 27 can be communicatively coupled to the processor 21, the memory 22, and/or the transceiver 23 by one or more communication links.

The door position sensor 28 can include, for example, an accelerometer, an electromagnetic ball switch, a contact sensor, a magnetic contact sensor, a reed switch sensor, an optical sensor, a motion sensor, an IR sensor, a linear variable differential transformer (LVDT), a piezoelectric sensor, a string potentiometer (or cable position transducer), a capacitive displacement sensor, a position encoder, or a device capable of detecting the position of the door 12, such as, for example, with respect to the body 14, and generating a position signal corresponding to the position of the door 12.

In certain embodiments, the door position sensor unit 28 is configured to communicate with the processor 21 and/or the processor 110 (shown in FIG. 6), including generating and sending a door position signal to the processor 21 or the processor 110.

In various embodiments, at least one of the motion sensor unit 24, light emitting unit 25, gas ejector unit 26, sound generator 27, and door position sensor 28 are communicatively coupled to the controller 30 (shown in FIG. 4 or 6) via the transceiver unit 23 and one or more communication links.

The light emitter unit 25 can be configured to add one or more lights that can emit or scan a beam from an obstruction, such as, for example, the door 12, all the way up, down, or sidewise as needed so as to be visible to a standing or approaching person or animal. The light emitter 25 can be configured to emit or scan a light beam selected to have any color in the visible spectrum, including different colors designated for different conditions (such as, for example, a red beam for a door that is fully open and a blue or green beam for a door that is only partially open).

In certain embodiments, the EME transducer 20 can include an actuator (not shown) configured to actuate and operate an article, such as, for example, a pole that pops up or sidewise in the line of vision to warn the person when the door 12 is in the open position. The actuator (not shown) can include a motor, a step-motor, a hydraulic actuator, or other device capable of moving the article.

In an embodiment, the EME transducer 20 can be configured to generate forced or pressurized air via the gas ejector unit 26, where the air can be directed toward and forced at the person from below so as to force the person to look down immediately and be forewarned of the danger. The gas ejector 26 can be configured to generate and direct forced air to create virtual reality.

In various embodiments, the light emitter unit 25 can include a lighting arrangement configured as a permanent fixture or a removable one. The latter can be particularly useful for mobile applications where, for example, repairmen and carpenters may carry foldable equipment that they can unfold for use in work locations. Such equipment can have protruding parts to hold tools and other accessories that may be low and below the line of sight, thereby presenting an imperceptible or easily overlooked obstruction to a person traveling in the direction of the protruding part.

In various embodiments, the EME transducer 20 and/or the system 100 can include a power source to supply power to the various components therein. For instance, the EME transducer 20 can include a battery to supply power to any one or more of the components 21 to 28. In at least one embodiment, the system 100 includes a power source that supplies power to the alarm controller 30 and each EME transducer 20. The power source can include, for example, an alternating current (AC) power supply (for example, 110V or 220V), a transformer, a battery, a solar power supply or other source of electric power.

In certain embodiments, the motion sensor unit 24 can be configured on a portion of, for example, the door 12 or body 14, such as, for example, on either or both side portions of the door 12, a top portion of the door 12, or anywhere along the perimeter of the door 12 or body 14, including around the entirety of the perimeter of the door 12 or body 14. The motion sensor unit 24 can include, for example, an infrared (IR) sensor, an optical sensor, or any other sensor capable of detecting motion of a person or thing along a pathway leading to the obstruction, such as, for example, a door in an open or partially open position.

In an embodiment, the EME transducer 20 can be configured to reproduce a light or light beams (via the light emitter unit 25) augmented by an audio alarm, such as, for example, a beeping sound (via the sound generator 27) and/or gas ejection (via the gas ejector 26), and further configured to detect motion (via the motion sensor unit 24) in harmful directions. The EME transducer 20 can be configured generate a door position signal (via the door position sensor 28) that includes a door position value indicative of the status of the door 12, including an angular position of the door 12 with respect to the gravitational vector or a plane of the body 14, such as, for example, an angle between 0-degrees and 90-degrees. The angular position can be the angle between a longitudinal axis or a surface plane of the door 12 and a longitudinal axis or surface plane of the body 14, which can be substantially parallel with the gravitational vector.

In various embodiment, the EME transducer 20 can be placed in various areas of equipment where the lights and/or audio (and/or gas ejection) alarms can be most noticeable to an approaching object or thing. By way of example only, without restricting the disclosure in any way, the system 100 can include one or more EME transducers 20 comprising: light emitter units 25 installed along an outer rim of the door 12 so as to project light vertically up or horizontally as depicted in, for example, FIG. 2; light emitter units 25 installed on the body 14 along the rim of the fixed non-movable portion of the appliance 10, for example, flush with the wall or cabinets as depicted in, for example, FIG. 3; or the gas ejector unit 26 that can supply forced air with gas ejection nozzles installed on the rims of the dropdown door 12 or on the non-moving body 14, for example, a side of the appliance 14 flush with the wall in a way as to blow air at an angle towards the oncoming person.

In certain embodiments, the EME transducer 20 can be affixed or installed to a cabinet or cabinet door to mitigate or resolve the risk of banging one's head or face against a cabinet door. Corner cabinets can particularly benefit from the installation of the EME transducer 20. This is a case where light may be shined towards the floor from the cabinet door or the cabinet.

FIG. 4 shows a block diagram that depicts a nonlimiting embodiment of the obstruction alarm (OA) system 100, constructed according to the principles of the disclosure. The OA system 100 can be included (or installed) in equipment or structures, such as, for example, household appliances (for example, stove, microwave, washer, dryer, etc.), household furniture (for example, cabinets, closets, desks, etc.), industrial appliances (for example, machinery, equipment, etc.), or the like, to prevent accidents and injury. In various embodiments, the OA system 100 includes the alarm controller 30 and one or more EME transducers 20.

Referring to FIGS. 2 and 4, in an embodiment the appliance 10 includes the OA system 10 in which the EME transducers 20 include light emitter units 25 (shown in FIG. 5) configured along the perimeter of the door 12 and arranged to emit light beams 15 as seen in FIG. 2.

In another embodiment, referring to FIGS. 3 and 4, the appliance 10 includes the OA system 100 in which the EME transducers 20 include light emitter units 25 configured on the body 14 along the perimeter of the door opening housing and arranged to emit light beams as seen in FIG. 3.

In another embodiment, the EME transducer 20 include light emitter units 25 configured along both the perimeter of the door 12 and on the body 14 along the perimeter of the door opening, and arranged to emit light beams as seen in both FIGS. 2 and 3, simultaneously, or in alternating patterns (for example, door light emitter units 25 turned ON and door-opening light emitter units 25 turned OFF, and then door light emitting units 25 turned OFF and door-opening light emitter units 25 turned ON).

In various embodiments, the EME transducer 20 can include only the motion sensor unit 24, only the light emitter unit 25, only the gas ejector unit 25, only the sound generator unit 27, or only the door position sensor 28. In other embodiments, the EME transducer 20 can include any combination of the foregoing.

Figure 6:
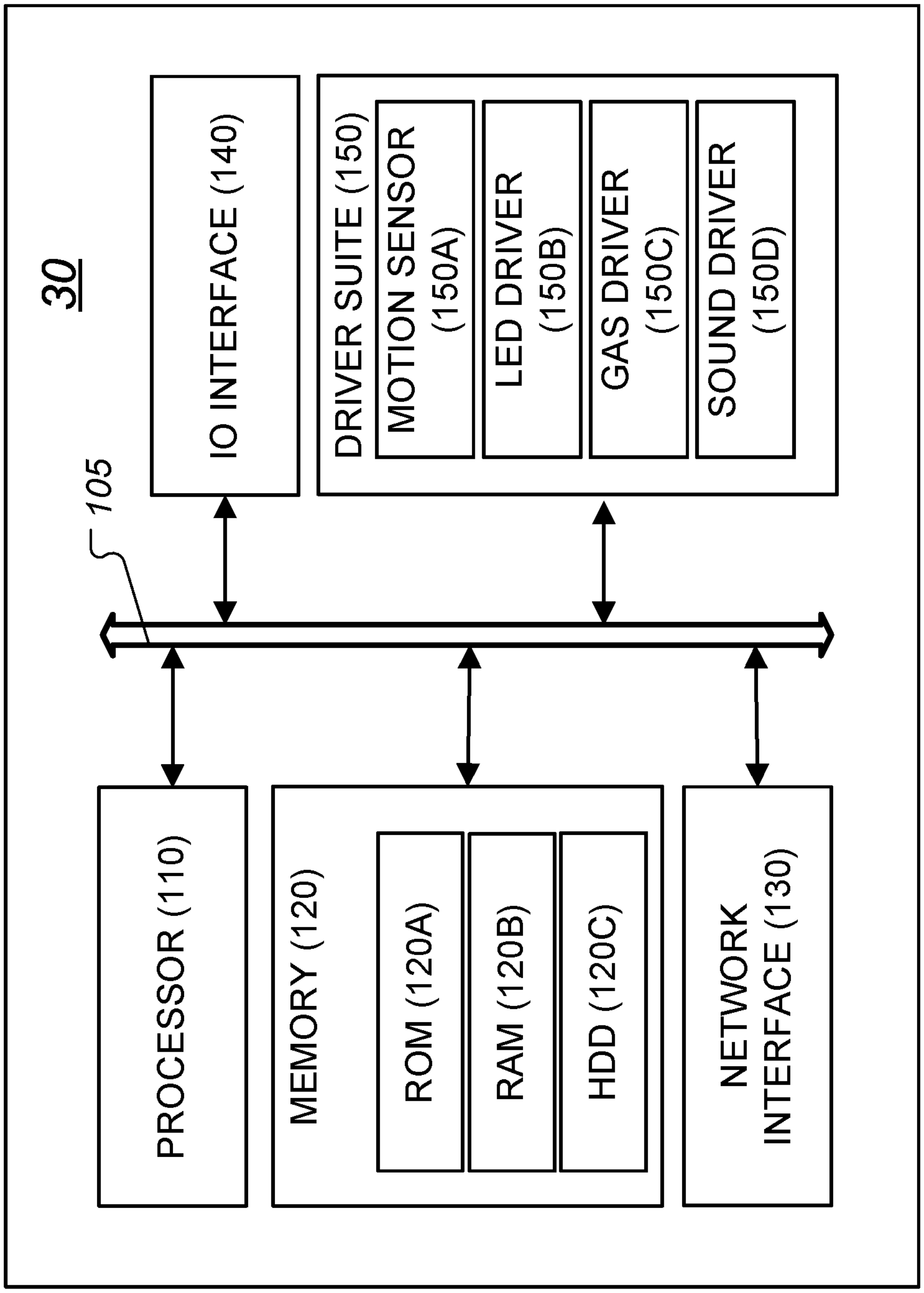
FIG. 6 illustrates an embodiment of an alarm controller, according to the principles of the disclosure.

FIG. 6 shows a block diagram of an embodiment of the alarm controller 30, configured according to the principles of the disclosure. The controller 30 can include a plurality of computer resource assets, including a bus 105, a processor 110, a memory 120, a network interface 130, an input-output (IO) interface 140, and a driver suite 150. Any of the computer resources assets 110 to 150 can be interconnected using a bus 105, or various communication links, including buses, and can be mounted on a common motherboard or in another manner, as appropriate.

The processor 110 can be arranged to execute instructions and process data within the controller 100, including instructions stored in the memory 120. The processor 110 can be configured to execute instructions and process data. The processor 110 can be arranged to interact with, or generate and send instruction signals to, for example, the driver suite 150 to control one or more EME transducers 20 (shown in FIG. 4 or 5).

The processor 110 can be configured to communicate over one or more communications link with any of the components 21-28 in the EME transducer 20 (shown in FIG. 5), and/or a control unit in the appliance 10, such as, for example, a dishwasher electronic control board, a washing machine controller, or the like.

In various embodiments, the EME transducer 20 (shown in FIG. 5) and/or controller 30 (shown in FIG. 6) can be configured to communicate with the control unit in the appliance 10 via a communication link that includes, for example, an interface and a serial bus. In certain embodiments, the controller 30 (or the EME transducer 20) is configured as a retrofit device, such as, for example, a dongle, that can be electronically connected to the control unit in the appliance 10. In certain embodiments, the system 100 can be configured as a retrofit device. The EME transducers 20 and controller 30 can be configured to draw power from the equipment or structure in which they are installed.

In at least one embodiment, the system 100 can be built into, or can include EME transducers 20 and/or controller 30 built into, new equipment or structures. The system 100 can be configured to draw power from the same source as the new equipment or structures. For instance, the system 100 can be connected to a power supply line of the new equipment or structures.

In various embodiments, the processor 110 can be configured to execute the instructions and process data to interact with and control an LED driver 150B, a gas driver 150C, or a sound driver 150D, to determine the position of the door 12 in real-time and reproduce light beam signals, gas flow, or sound signals, such as, for example, via the EME transducers 20.

The memory 120 can include a read-only memory (ROM) 120A, a random-access memory (RAM) 120B, and a hard disk drive (HDD) 120C. The memory 120 can provide nonvolatile storage of data, data structures, and computer-executable instructions, and can accommodate the storage of any data in a suitable digital format. The memory 120 can include a computer-readable medium that can hold executable or interpretable computer code (instructions) that, when executed by the processor 110, cause the steps, processes and methods of the various embodiments in this disclosure to be carried out. The computer-readable medium can be contained in the memory 120, and can include sections of computer code that, when executed by the processor 110, cause the controller 100 to monitor an area for moving objects via, for example, a motion sensor driver 150A, and render an alarm via, for example, the LED driver 150B, gas driver 150C, or sound driver 150D.

A basic input-output system (BIOS) can be stored in the ROM 120A, which can include, for example, a non-volatile memory, an erasable programmable read-only memory (EPROM), or an electrically erasable programmable read-only memory (EEPROM). The BIOS can contain the basic routines that help to transfer information between any one or more of the computing resource assets in the controller 30 (or system 100), such as during start-up.

The RAM 120B can include, for example, dynamic random-access memory (DRAM), a synchronous dynamic random-access memory (SDRAM), a static random-access memory (SRAM), or a nonvolatile random-access memory (NVRAM) for caching data.

The HDD 120C can include, for example, an enhanced integrated drive electronics (EIDE) drive or any suitable hard disk drive for use with the particular application. The HDD 120C can be configured for external use in a suitable chassis (not shown).

A computer program product can be tangibly embodied in a non-transitory computer-readable medium, which can be contained in the memory 120, or provided as an external computer resource asset and connected to the bus 105. The computer program product can contain instructions that, when executed, perform one or more methods or operations, such as those included in this disclosure.

Any number of computer resources can be stored in the memory 120, including, for example, a program module, an operating system, an application program, an application program interface (API), or program data. The computing resource can include an API such as, for example, a web API, a simple object access protocol (SOAP) API, a remote procedure call (RPC) API, a representation state transfer (REST) API, or any other utility or service API. Any (or all) of the operating system, application programs, APIs, program modules, and program data can be cached in the RAM 120B as executable sections of computer code.

The network interface 130 can be connected to a network, such as, for example, a residential, industrial, institutional, or other local area network (LAN), which can connect to the Internet. The network interface 130 can include a wired or a wireless communication network interface (not shown) or a modem (not shown). When used in a LAN, the controller 100 can be connected to the LAN network through the wired or wireless communication network interface; and, when used in a wide area network (WAN), the controller 100 can be connected to the WAN network through the modem. The modem (not shown) can be internal or external and wired or wireless. The modem can be connected to the system bus 105 via, for example, a serial port interface (not shown). The network interface 130 can include a receiver (not shown), a transmitter (not shown) or a transceiver (not shown).

The input-output (IO) interface 140 can receive commands or data from an operator via a user interface (not shown), such as, for example, a keyboard (not shown), a mouse (not shown), a pointer (not shown), a stylus (not shown), a microphone (not shown), a speaker (not shown), or a display device (not shown). The received commands and data can be forwarded from the IO interface 140 as instruction to data signals, via the bus 105, to any of the computer resource assets in the controller 30.

In at least one embodiment, the driver suite 150 includes the motion sensor driver 150A, the LED driver 150B, the gas driver 150C, and the sound driver 150D. The driver suite 150 can be communicatively coupled to one or more EME transducers 20 (shown in FIG. 5) and configured to receive motion data and motion detection signals from the motion sensor unit 24, and, through interactions with the processor 110, send data and control signals to the light emitter unit 25, the gas ejector unit 26 or the sound generator unit 27.

Figure 7:
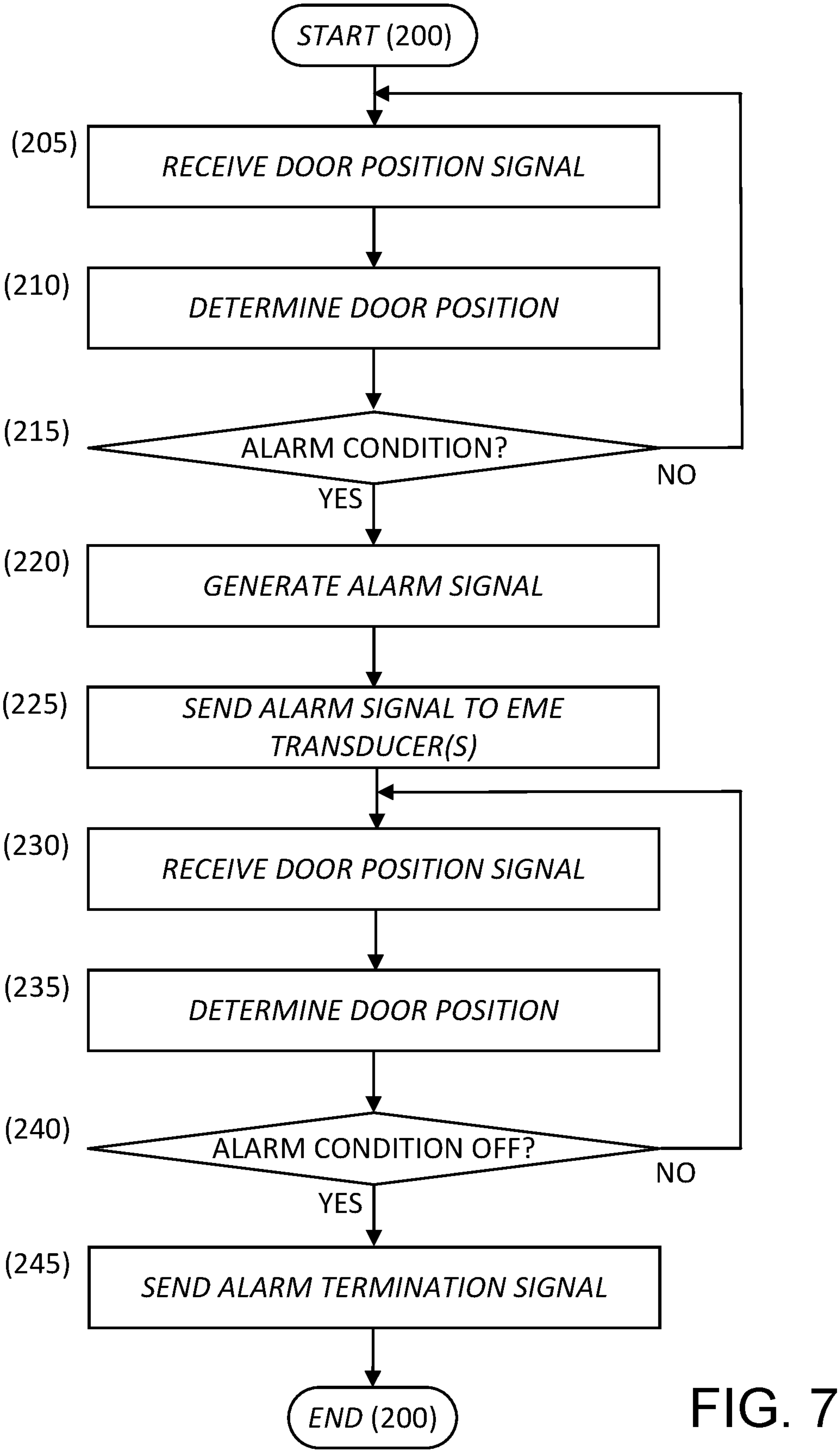
FIG. 7 illustrates an embodiment of an alarm control process, according to the principles of the disclosure.

FIG. 7 shows a nonlimiting embodiment of a process 200 for generating an alarm, according to the principles of the disclosure. The process 200 can be performed by the controller 30 (shown in FIG. 6). In at least one embodiment, the controller 30 includes computer program instructions that, when executed by the processor 110, cause the controller 30 to carry out each of the steps of the process 200. The computer program instructions can be stored in a non-transient computer storage medium in the memory 120 (shown in FIG. 6) and accessed and executed by the processor 110.

Referring to FIGS. 5-7 contemporaneously, a door position signal is received from either the door position sensor 28 or the control unit (not shown) of the appliance 10 (Step 205). On the basis of the received door position signal, the processor 110 determines the door position value, such as, for example, the angle θ between a longitudinal axis or surface plane of the door 12 and the gravitational vector, or a longitudinal (or vertical) axis or vertical plane of the appliance 10, which is typically parallel to the gravitational vector (Step 210). A determination is then made based on the door position whether an alarm condition exists based on the determined door position (Step 215).

In certain embodiments, the alarm condition is a one-step alarm condition that is determined by comparing the real-time door position angle θ a predetermined threshold angle $\theta_{TH}$, such that if $\theta>\theta_{TH}$, then an alarm condition is determined. The threshold angle $\theta_{TH}$ can be set to an angle value, for example, between about 5° and about 90°, such as, $\theta_{TH}$=5°, 10°, 15°, 20°, 25°, 30°, 35°, 40°, 45°, 50°, 55°, 60°, 65°, 70°, 75°, 80°, or greater. Other threshold angle $\theta_{TH}$ values are also contemplated, including a $\theta_{TH}$ value greater than 0° and less than 180°, or any value therebetween.

In at least one embodiment, the alarm condition is a two-step alarm condition that, in addition to the one-step alarm condition determination based on the real-time door position, is determined by also monitoring for motion detection signals from the motion sensor unit 24 (shown in FIG. 5), and, when a motion detection signal is received, determining whether the motion detection signal is indicative of motion such as, for example, by a person. In this regard, the motion detection signal received from the motion sensor 24 can be compared against a predetermined threshold value to determine whether the detected motion is that of a person, a small animal, or a noisy environment. The noisy environment can include, for example, heat dissipated by the appliance 10 when the door 12 is opened, which can be detected by the motion sensor unit 24 in certain situations as a motion signal, such as, for example, where the motion sensor unit 24 includes an IR sensor.

If an alarm condition is determined (YES at Step 215), then an alarm signal is generated (Step 220) and sent to the EME transducer 20 (Step 225), otherwise (NO at Step 215) the controller 30 continues to detect any further door position signals (Step 205) and determine any changes in the real-time position of the door (Step 210).

In various embodiments, the generated alarm signal can include a light emission signal, a gas ejection signal, and/or a sound generation signal, which, when received by the EME transducer 20, cause the light emitter 25, gas ejector unit 26, and sound/or sound generator 27 to, respectively, produce one or more light beams, gas ejection streams, and/or sounds.

The controller 30 can continue to monitor and determine the position of the door 12 in real-time by receiving the door position signal from the door position sensor 28 (FIG. 5), or from the controller of the appliance 10, indicative of the real-time position of the door 12 (Step 230) and if the position of the door 12 has changed such that the one-step alarm condition has been removed (YES at Step 240), an alarm termination signal can be sent to the EME transducer 20 (Step 245) to terminate all alarms, otherwise (NO at step 240), the process can return and repeat Steps 230 to 240.

The terms "a," "an," and "the," as used in this disclosure, means "one or more," unless expressly specified otherwise.

The term "bus," as used in this disclosure, means any of several types of bus structures that can further interconnect to a memory bus (with or without a memory controller), a peripheral bus, or a local bus using any of a variety of commercially available bus architectures.

The term "communicating device" or "communication device," as used in this disclosure, means any computing device, hardware, or computing resource that can transmit or receive digital or analog signals or data packets, or instruction signals or data signals over a communication link. The device can be portable or stationary.

The term "communication link," as used in this disclosure, means a wired and/or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, GSM voice calls, SMS, EMS, MMS messaging, CDMA, TDMA, PDC, WCDMA, CDMA2000, GPRS, WiFi, WiMAX, IEEE 802.11, DECT, 0G, 1G, 2G, 3G, 4G, 5G or 6G cellular standards, or Bluetooth. A communication link can include, for example, an RS-232, RS-422, RS-485, or any other suitable interface.

The terms "computer" or "computing device," as used in this disclosure, means any machine, device, circuit, component, or module, or any system of machines, devices, circuits, components, or modules, which can be capable of manipulating data according to one or more instructions, such as, for example, without limitation, a processor, an application specific integrated circuit (ASIC), a field programmable gate array (FPGA), a microprocessor (μP), a central processing unit (CPU), a graphic processing unit (GPU), a general purpose computer, a super computer, a personal computer, a laptop computer, a palmtop computer, a notebook computer, a smart phone, a mobile phone, a tablet, a desktop computer, a workstation computer, a server, a server farm, a computer cloud, or an array of processors, ASICS, FPGAs, μPs, CPUs, GPUs, general purpose computers, super computers, personal computers, laptop computers, palmtop computers, notebook computers, desktop computers, workstation computers, or servers. A computer or computing device can include hardware, firmware, or software that can transmit or receive data packets or instructions over a communication link. The computer or computing device can be portable or stationary.

The term "computer asset," as used in this disclosure, means a computer resource, a computing device, a communicating device, or a computer-readable medium.

The term "computer resource," as used in this disclosure, means software, a software application, a web application, a webpage, a document, a file, a record, an application program(ming) interface (API), web content, a computer application, a computer program, computer code, machine executable instructions, or firmware. A computer resource can include an information resource. A computer resource can include machine instructions for a programmable computing device, and can be implemented in a high-level procedural or object-oriented programming language, or in assembly/machine language.

The term "computer-readable medium," as used in this disclosure, means any storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "Cloud," which includes a distribution of files across multiple (e.g., thousands of) memory caches on multiple (e.g., thousands of) computers. The computer-readable medium can include magnetic discs, optical disks, memory, or Programmable Logic Devices (PLDs).

Various forms of computer readable media can be involved in carrying sequences of instructions to a computer. For example, sequences of instruction (i) can be delivered from a RAM to a processor, (ii) can be carried over a wireless transmission medium, and/or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

The terms "including," "comprising" and variations thereof, as used in this disclosure, mean "including, but not limited to," unless expressly specified otherwise.

The term "network," as used in this disclosure means, but is not limited to, for example, at least one of a personal area network (PAN), a local area network (LAN), a wireless local area network (WLAN), a campus area network (CAN), a metropolitan area network (MAN), a wide area network (WAN), a metropolitan area network (MAN), a wide area network (WAN), a global area network (GAN), a broadband area network (BAN), a cellular network, a storage-area network (SAN), a system-area network, a passive optical local area network (POLAN), an enterprise private network (EPN), a virtual private network (VPN), the Internet, or any combination of the foregoing, any of which can be configured to communicate data via a wireless and/or a wired communication medium. These networks can run a variety of protocols, including, but not limited to, for example, Ethernet, IP, IPX, TCP, UDP, SPX, IP, IRC, HTTP, FTP, Telnet, SMTP, DNS, ARP, ICMP.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described herein may be performed in any order practical.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A system for rendering an alarm signal when a door of an appliance is in a hazard condition, the system comprising:

a position sensor configured to detect a position of the door of the appliance;

at least one electromagnetic (EME) transducer configured to render the alarm signal when the door of the appliance is in the hazard condition, wherein the at least one electromagnetic (EME) transducer includes a motion sensor unit and at least one of a light emitter unit, a gas ejector unit, and a sound generator, and wherein the appliance is a household appliance; and a controller communicatively coupled to the at least one EME transducer and the position sensor, wherein the controller is configured to receive a door position value from the position sensor, monitor for a motion detection signal from the motion sensor unit, determine the hazard condition when the motion detection signal is indicative of motion by an animal, and generate the alarm signal based on the hazard condition.

2. The system of claim 1, wherein the motion includes movement of the animal traveling in a pathway obstructed by the door.

3. The system of claim 1, wherein the controller is further configured to send a light emission signal, a gas ejection signal, or a sound signal to the at least one EME transducer.

4. The system of claim 3, wherein the controller comprises a driver configured to generate electronic signals to adjust or control one of the motion sensor unit, the light emitter unit, the gas ejector unit, and the sound generator.

5. The system of claim 1, wherein the controller is further configured to send an electronic signal comprising at least one of a light emission signal, a gas ejection signal, or a sound signal.

6. The system of claim 1, wherein the controller includes deep learning to determine if the animal is a person or a pet.

7. The system of claim 1, wherein the controller is configured to determine whether a detected motion is that of a person, a small animal, or a noisy environment.

8. The system of claim 1, wherein the position sensor comprises an accelerometer.

9. The system of claim 1, wherein the at least one EME transducer is an integrated device provided as a single piece that comprises one or more of the motion sensor unit, the light emitter unit, the gas ejector unit, and the sound generator.

10. The system of claim 1, wherein one or more of the motion sensor unit, the light emitter unit, the gas ejector unit, and the sound generator is located external to, and separate from, the appliance.

11. The system of claim 1, wherein the gas ejector unit is configured to supply a flow of steam, gas, or particles for reflection of light for visibility as a beam.

12. The system of claim 11, wherein the gas ejector unit comprises a fan, at least one nozzle, and a gas supply.

13. A computer-implemented method for rendering an alarm signal when a door of an appliance is in a hazard condition, the method comprising:

receiving, by a controller, a door position signal from a position sensor that includes a door position value;

receiving, by the controller, a motion signal from a motion senor unit indicative of motion by an animal;

determining, by the controller, a hazard condition based on the door position value and the motion by the animal;

generating an electronic signal based on the hazard condition; and sending the electronic signal to at least one electromagnetic (EME) transducer configured to render the alarm signal in response to the received electronic signal, wherein the at least one electromagnetic (EME) transducer includes at least one of a light emitter unit, a gas ejector unit, and a sound generator, wherein the appliance is a household appliance.

14. The computer-implemented method of claim 13, further comprising:

determining, by artificial intelligence, whether the animal is a person or a pet.

15. The computer-implemented method of claim 13, wherein the electronic signal comprises at least one of:

a light emission signal that causes the light emitter unit to render one or more light beams in a predetermined beam direction;

a gas ejection signal that causes the gas ejector unit to supply a pressurized gas in a predetermined gas direction; and a sound signal to cause the sound generator to emit a sound.

16. The computer-implemented method of claim 13, wherein the door position signal is received from an accelerometer.

17. The computer-implemented method of claim 13, wherein the at least one EME transducer is an integrated device provided as a single piece that comprises the at least one of the motion sensor unit, the light emitter unit, the gas ejector unit, and the sound generator.

18. The computer-implemented method of claim 13, wherein one or more of the motion sensor unit, the light emitter unit, the gas ejector unit, and the sound generator is located external to, and separate from, the appliance.

19. The computer-implemented method of claim 13, wherein the gas ejector unit is configured to supply a flow of steam, gas, or particles for reflection of light for visibility as a beam.

20. The computer-implemented method of claim 13, wherein the gas ejector unit comprises a fan, at least one nozzle, and a gas supply.

* * * * *